March 26, 1968    E. C. LENZEN    3,374,570
FISHHOOK DISGORGER
Filed Dec. 15, 1965
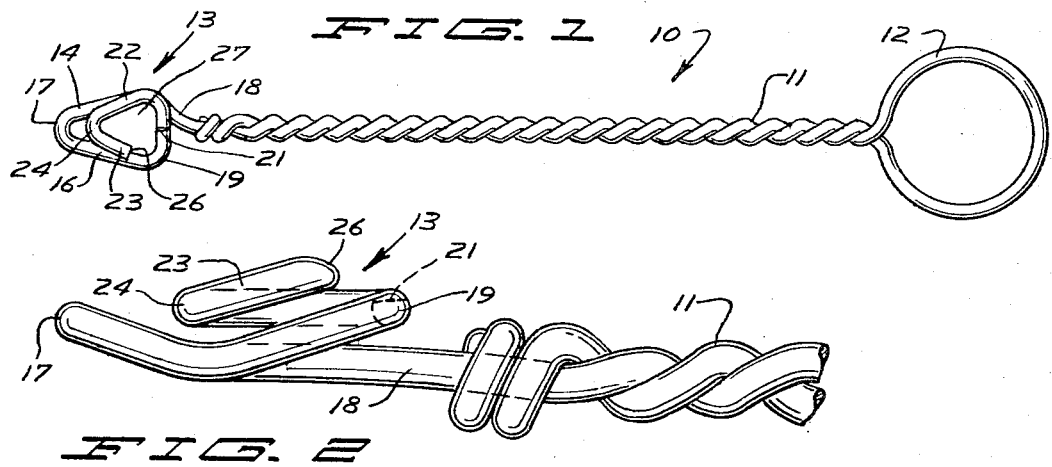
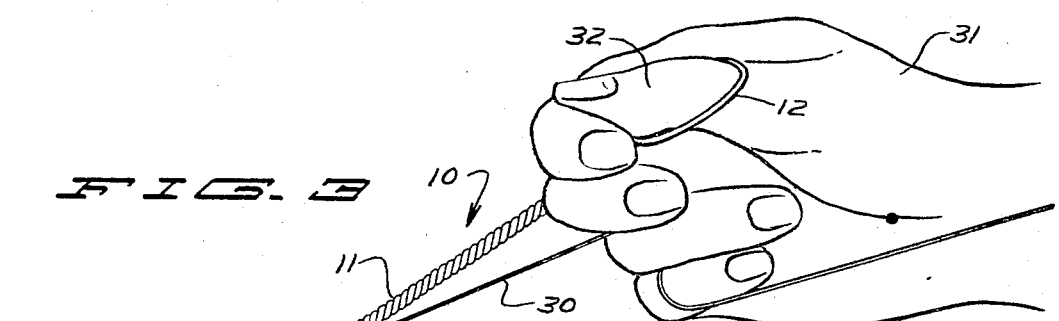
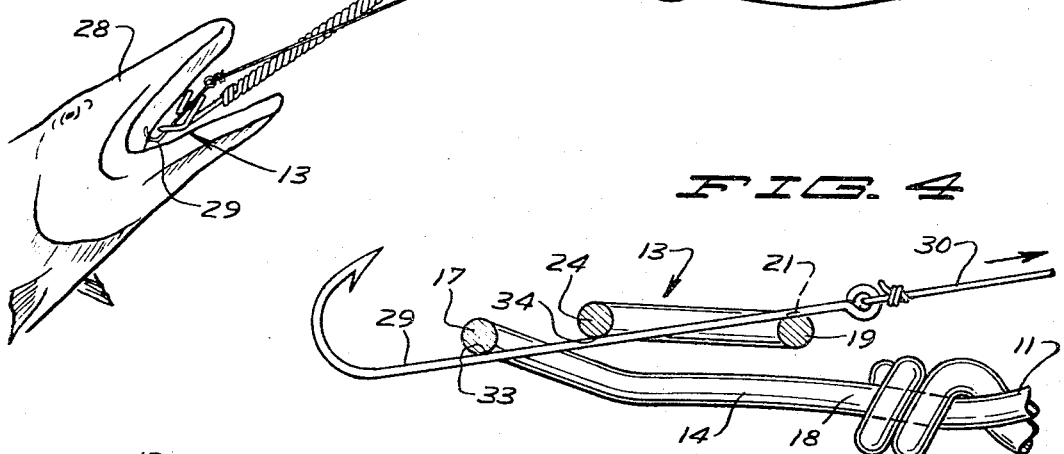
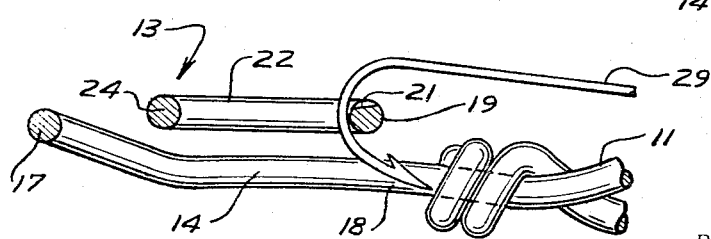
INVENTOR.
ERWIN C. LENZEN
BY
Braddock & Burd
ATTORNEYS United States Patent Office 3,374,570
Patented Mar. 26, 1968

3,374,570
FISHHOOK DISGORGER
Erwin C. Lenzen, Carver, Minn. 55315
Filed Dec. 15, 1965, Ser. No. 514,042
10 Claims. (Cl. 43—53.5)

ABSTRACT OF THE DISCLOSURE

A fishhook disgorger having a linear handle extended between a thumb loop and a working eye. The eye has a pair of connected V-shaped sections both converging in a forward direction. The V-shaped sections are connected with a transverse member having a longitudinal groove on the top side for receiving the shank of a fishhook. The V-sections are longitudinally spaced from each other so that in use the hook engages the bottom of the noses or apex portions of the V-sections and the top of the midportion of the transverse member.

Summary of invention

This invention relates to an instrument for dislodging and removing a hook from a body and more particularly to a fishhook disgorger used to disengage an embedded barbed fishhook from the mouth of a fish and to remove the hook from the fish.

Fishhook disgorgers have been used and are presently used to facilitate the disengagement and the removal of barbed hooks from fish. Examples of fishhook disgorgers are shown in the following U.S. Patents: Underwood No. 2,441,458; Borup No. 2,662,331; Steiner No. 2,781,599; Basinski No. 3,034,252. These hook disgorgers allow the hook to move relative to the working ends or hook holding eyes making removal of the hook difficult and at times impossible. Using these disgorgers the hooks can only be removed by extensive damage to fish making it undesirable to return fish to the water. The disgorger of this invention is constructed to longitudinally locate the fishhook in the working eye of the disgorger so as to firmly and longitudinally position the hook enabling the hook to be removed from the fish with a minimum of damage to the fish.

Briefly, the disgorger of this invention is a one-piece instrument having an elongated handle adapted to be held in one hand by a fisherman. Integral with one end of the handle is a working eye which can be readily moved into position about the shank of a fishhook. A thumb loop is integral with the opposite end of the handle. The eye has three separate portions which engage longitudinal spaced portions of the hook shank longitudinally positioning the hook shank with the handle. The eye has a general arrowhead outline with center opening of a size which allows the use of most any type of leader and hook connectors, irregular shaped hooks, and hooks attached to bugs and flies, such as the hooks used to catch pan fish.

In use, the disgorger is held in one hand and the fish held in the other hand. The working eye is then positioned over the line connected to the fishhook and moved into the fish's mouth to locate the hook without the necessity for visual inspection on the part of the fisherman. As the working eye of the disgorger moves over the shank of the fishhook it locates the shank longitudinally of the handle. The hook is disengaged from the fish by simultaneously placing a slight downward pressure along with angular upward movement on the handle whereby the curved portion of the hook moves downwardly and rearwardly out of the fish's body with a minimum of damage to the fish.

In the drawing:
FIGURE 1 is a plan view of the fishhook disgorger of this invention;
FIGURE 2 is an enlarged side view of the working eye of the disgorger of FIGURE 1;
FIGURE 3 is a diagrammatic view showing use of the disgorger to remove a fishhook from a fish;
FIGURE 4 is an enlarged sectional view of the working eye operatively engaged with a fish hook attached to a line; and
FIGURE 5 is a view similar to FIGURE 4 showing the position of the hook after the hook is released from the fish.

Referring to FIGURE 1 of the drawing, the hook disgorger or instrument is indicated generally at 10 and comprises a one-piece instrument formed from a single piece of stiff wire. Disgorger 10 may be formed from any suitable rigid material which has sufficient rigidity to move a hook which is embedded in a body. The size and length of the disgorger may vary so as to be used with pan fish as well as large game fish. Disgorger 10 is described as an ichthyological instrument used to remove a barbed hook from a fish. The following specific description is not intended to limit the use of the instrument to remove barbed hooks from fish. The instrument can be used to remove hook-like members from a body. Disgorger 10 comprises a linearly elongated handle 11 extended between a thumb loop 12 and a working eye indicated generally at 13. Loop 12 is integral with one end of the handle and is formed with the handle from a single piece of wire. The loop has a circular shape and is of a size to accommodate the thumb of a person's hand. From loop 12 the end of the wire is twisted about the mid-section of the wire to form the stiff elongated handle 11.

Working eye 13 is integral with the end of handle 11 opposite loop 12. Eye 13 comprises a pair of connected V-shaped sections longitudinally aligned with the handle. The V-shaped sections converge in a forward direction with their apex portions longitudinally aligned with the handle. The first V-shaped section has forwardly and inwardly tapered sides 14 and 16 each joined to an upwardly turned curved nose 17. Side 14 is integral with a laterally curved end section 18 of handle 11. Side 16 projects upwardly, outwardly and rearwardly from the nose 17 as shown in FIGURES 1 and 2. The rear end of side 16 is joined to a member 19 extended transversely across the longitudinal axis of handle 11. The top of the midsection of member 19 has a longitudinal groove 21 to accommodate a portion of the fishhook shank.

The second V-shaped section is positioned above the first V-shaped section and comprises a pair of forwardly projected and inwardly converging sides 22 and 23 each joined to a curved nose 24. Nose 24 is rearwardly and longitudinally aligned with nose 17 making the angle between sides 22 and 23 greater than the angle between sides 14 and 16. The rear end of side 22 is joined to member 19 whereby the entire eye 13 is formed from a single piece of wire. The rear portion of side 23 terminates in a rounded end 26 to minimize sharp edges which may injure the fish. All of the surfaces of eye 13 are rounded to achieve this purpose.

As shown in FIGURE 1, the center 27 of eye 13 has a relatively large opening to accommodate the shank of a fishhook as well as weights and artificial bugs secured to the shank. As shown in FIGURE 2, the first and second V-shaped sections are vertically spaced from each other enabling the line to be easily located in the opening 27.

Referring to FIGURE 3, a game fish 28 has taken hook 29 attached to line 30. Disgorger 10 is used by the fisherman to release and remove hook 28 from the fish's mouth. This is accomplished by holding the disgorger 10 in one hand 31 with thumb 32 extended through loop 12. Handle 11 is positioned between the first and second fingers. The remaining fingers are used to apply a slight tension on line 30. The fisherman holds the fish 28 with his other hand (not shown)

Line 30 is initially threaded through the opening 27 in eye 13 by moving the line between sides 14 and 22 around nose 24 and between sides 16 and 23 into opening 27. Side 23 which projects rearwardly and outwardly prevents the line from leaving the opening 27. The working eye 13 is then moved down line 30 over the shank of the fishhook to a position as shown in FIGURES 3 and 4. The sides of the turned up portion of nose 17 function as guides and form a pocket for receiving the shank of the fishhook keeping the hook from going to either side of the eye. By placing a slight tension on line 30 the shank of hook 29, as shown in FIGURE 4, engages nose 17 at point 33, nose 24 at point 34 and rests in groove 21 formed in the top of transverse member 19. The pocket of upwardly turned nose 17 and groove 21 longitudinally aligns the hook with handle 11.

Hook 29 is released from the mouth of the fish by applying a downward force to the disgorger and at the same time rotate handle 11 upward. Eye 13 in engagement with hook shank at points 33 and 34 and groove 21 moves the curved portion and barbed end of hook generally along a curved path which follows the curvature of the hook. During the final stage of releasing the hook from the fish nose 17 is used to apply a downward pressure to the curved portion of the hook.

After the hook is released from the fish the tension on line 30 moves the hook to the upper portion of eye 13 as shown in FIGURE 5. The curved portion of hook 29 rides up one of the diverging sides 14 or 16, turns about one hundred eighty degrees and hooks over transverse member 19. With the hook in this position the barbed end is aligned with and adjacent the end 18 of handle 11 thereby preventing the barbed end from catching on or cutting the fish's mouth during removal of hook from the fish.

A preferred embodiment of the invention has been described and shown in the drawing. Various structural changes, as the addition of a plastic cover over handle 11 and loop 12, changes in form and details of the disgorger illustrated may be made by persons skilled in the art without departing from the spirit and scope of the invention.

The invention is to be limited only as indicated by the following claims considered with the prior art.

I claim:

1. An instrument for removing a hook from a body comprising an elongated handle, a hook receiving eye secured to the forward end of the handle, said eye having first forwardly projected sides joined to a first curved nose and second forwardly projected sides joined to a second curved nose, said second nose positioned rearwardly of said first nose, and a member extending transversely of the axis of said handle and positioned rearwardly of both of said noses and connected to opposite sides of the first and second projected sides whereby the hook engages the first nose, the second nose and member during the removal of the hook from the body.

2. The instrument defined in claim 1 including a loop secured to the other end of the handle for receiving a digit of a hand.

3. The instrument defined in claim 1 wherein said first nose is bent upwardly from the first sides.

4. An instrument for removing a hook from a body comprising: an elongated handle, a hook receiving eye secured to one end of the handle, said eye having first forwardly projected sides joined to a first curved nose and second forwardly projected sides joined to a second curved nose, said second nose positioned rearwardly of said first nose, and a transverse member connected to opposite sides of the first and second projected sides whereby the hook engages the first nose, the second nose, and the transverse member during the removal of the hook from the body, said transverse member having a longitudinal groove on the top side of the member for receiving the hook.

5. The instrument defined in claim 1 wherein said first sides converge forwardly toward the first nose.

6. The instrument defined in claim 1 wherein said second sides converge forwardly toward the second nose.

7. The instrument defined in claim 1 wherein said first sides converge forwardly toward the first nose and the second sides converge forwardly toward the second nose.

8. The instrument defined in claim 7 wherein said first nose is bent upwardly from the first sides.

9. The instrument defined in claim 1 wherein said handle comprises two sections, twisted about each other.

10. The instrument defined in claim 1 wherein the entire instrument is formed from a single piece of wire.

References Cited

UNITED STATES PATENTS

| | | | |
|---|---|---|---|
| 498,094 | 5/1893 | Verharen | 43—53.5 |
| 2,662,331 | 12/1953 | Borup | 43—53.5 |
| 2,781,599 | 2/1957 | Steiner | 43—53.5 |

SAMUEL KOREN, *Primary Examiner.*

J. H. CZERWONKY, *Assistant Examiner.*